UNITED STATES PATENT OFFICE.

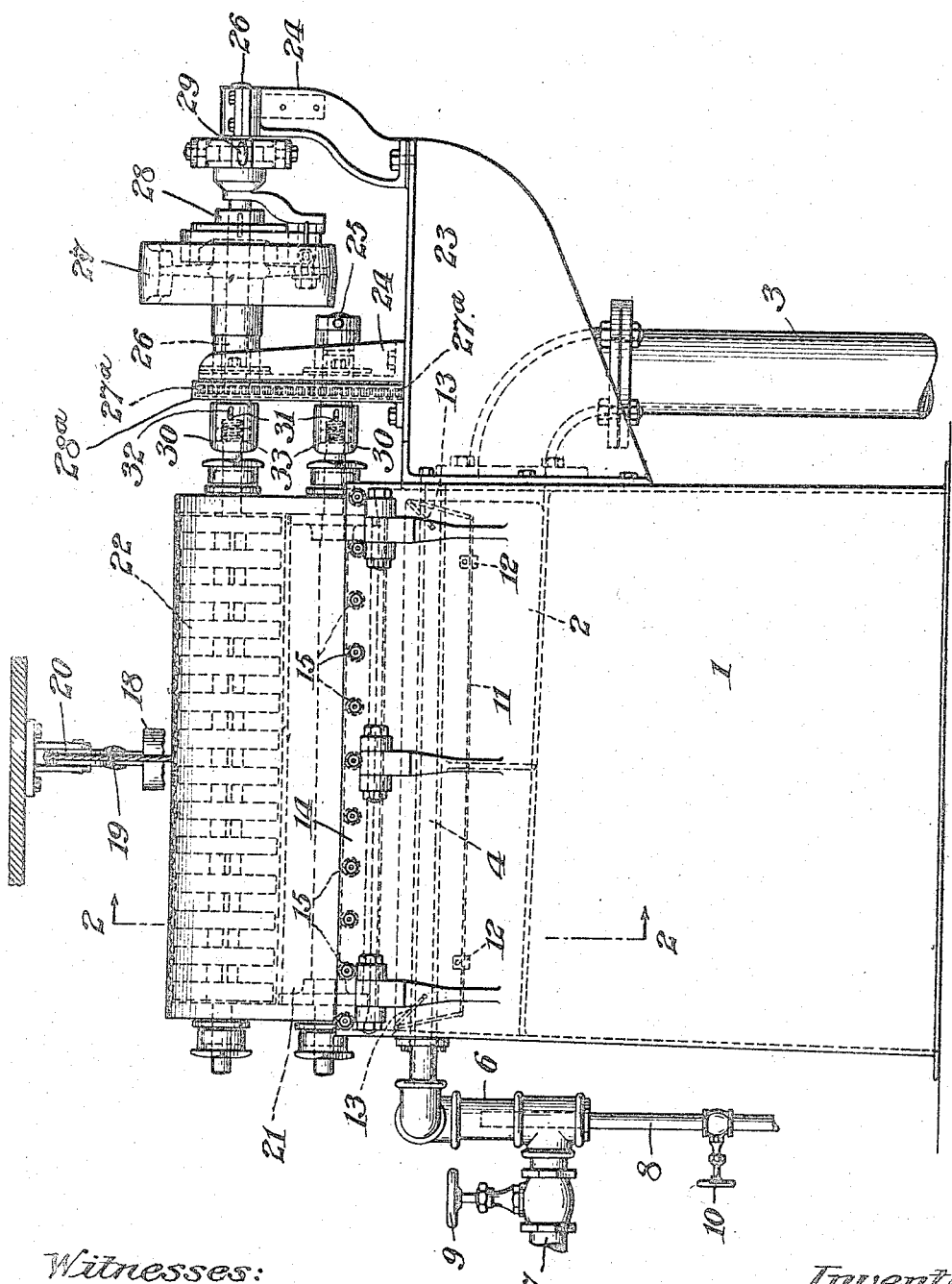

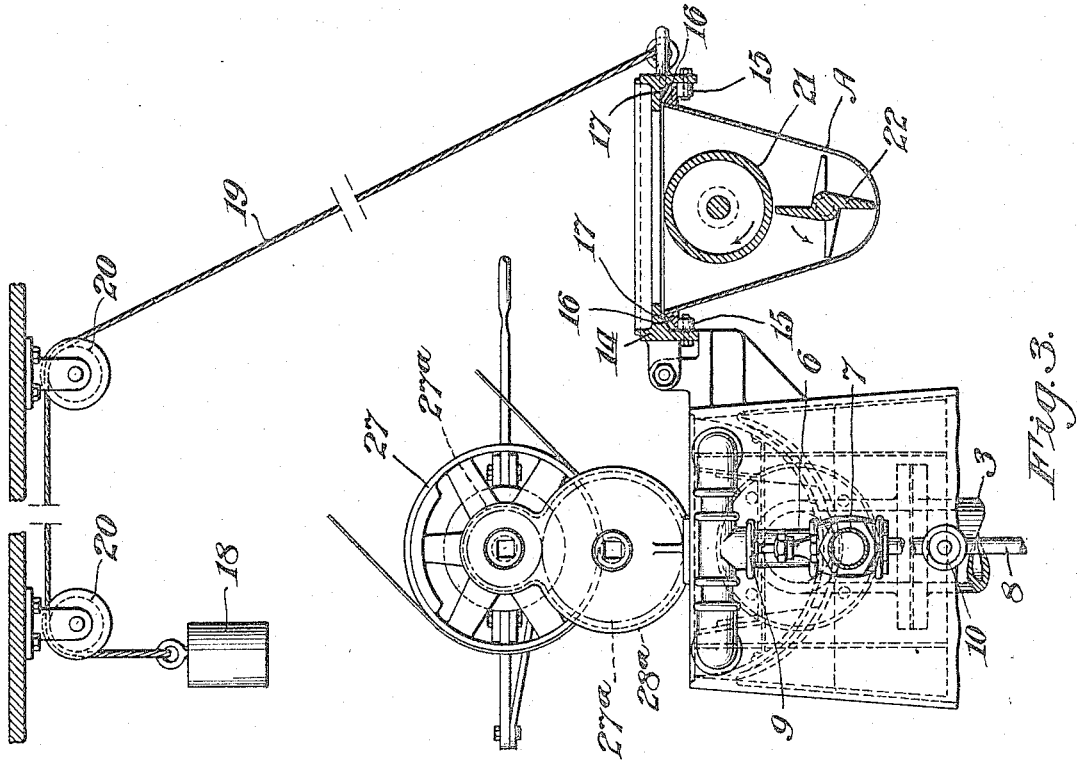
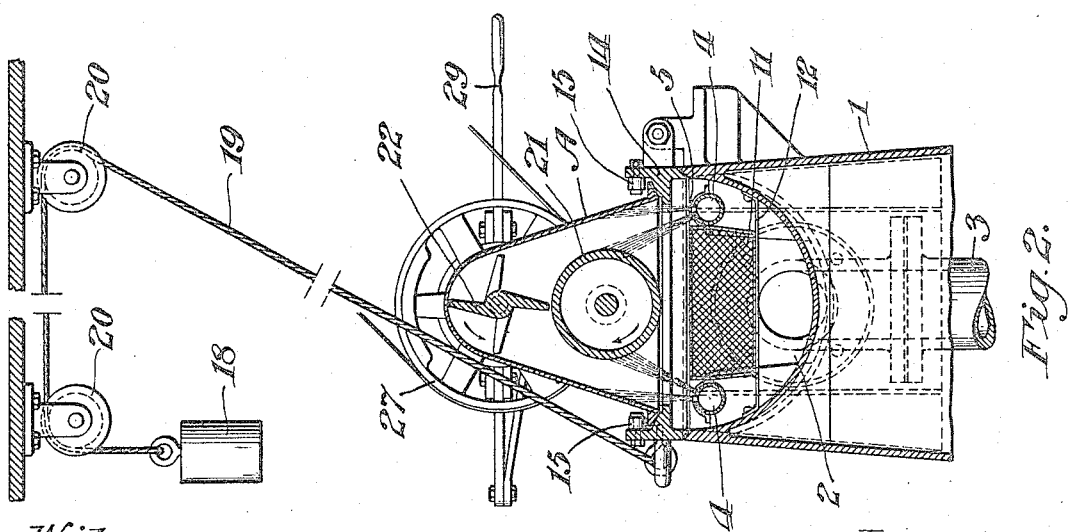

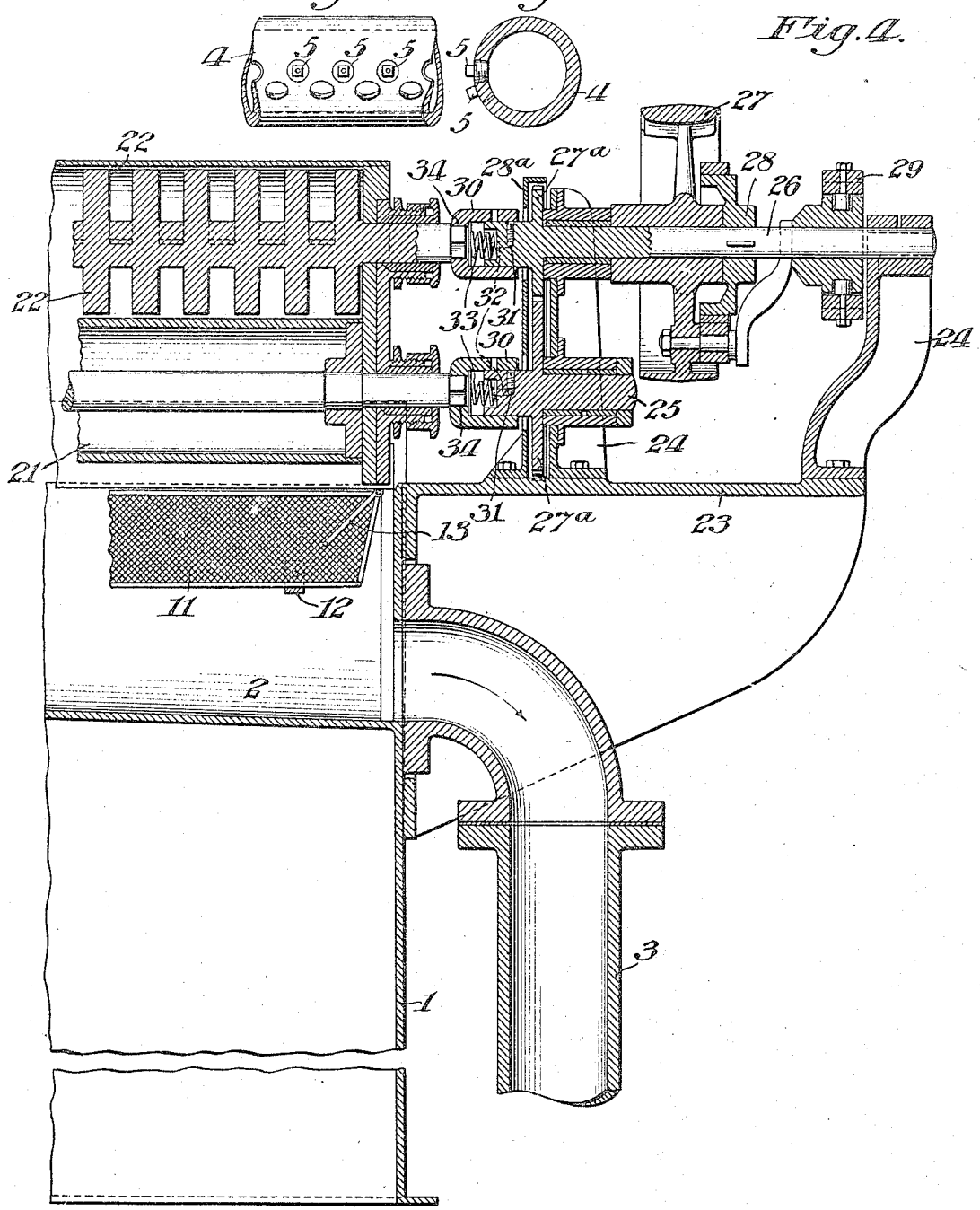

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

APPARATUS FOR CLEANSING MATCH-COMPOSITION TANKS, &c.

1,127,415.  Specification of Letters Patent.  Patented Feb. 9, 1915.

Application filed October 23, 1912. Serial No. 727,281.

*To all whom it may concern:*

Be it known that I, JOSEPH C. DONNELLY, a citizen of the United States, and resident of Barberton, in the county of Summit and State of Ohio, have invented certain new and useful Improvements in Apparatus for Cleansing Match-Composition Tanks, &c., of which the following is a specification.

This invention relates to apparatus for cleansing tanks and other receptacles, and more especially the composition-tanks employed in match making machinery.

The object of my invention is the provision of an apparatus whereby the interior of the tank and the match-composition stirring and applying mechanism therein mounted can be readily and effectually freed of the composition which adheres to and cakes upon the same.

In the particular form of embodiment of my invention herein selected for illustration, I employ a base or body structure upon which the tank to be cleansed is supported in inverted position, and I provide means whereby a cleansing fluid is directed into the interior of the tank in a manner to act efficiently upon the walls of the tank and upon the composition stirring and applying devices. Provision is had whereby the tank can be readily applied to or removed from the structure, and mechanism is provided whereby the composition stirring and applying devices within the tank are rotated in order to subject them thoroughly to the action of the cleansing fluid.

The invention also comprises various features of construction and arrangements of parts, all of which will be hereinafter described and claimed.

In the annexed drawings—Figure 1 is a front elevation of an apparatus embodying my invention, a match composition tank being illustrated as applied thereto. Fig. 2 is a partial transverse vertical section, as on the line 2—2 of Fig. 1. Fig. 3 is an end elevation of the apparatus, showing the tank and its frame in loading position laterally of the apparatus, said tank and frame being illustrated in section. Fig. 4 is a longitudinal vertical section, enlarged, through the drive mechanism and the adjacent end of the apparatus and adjuncts, showing a portion of the composition tank and the detachable shaft couplings for its composition roller and stirrer. Fig. 5 is a detail, enlarged, of one of the sprinkler pipes showing the staggered arrangement of the orifices for the nozzles, one row of nozzles being omitted. Fig. 6 is a transverse section of the pipe, showing the nozzles therein.

1 represents the base of the apparatus, the same in its preferred form comprising a substantial casing within the upper portion of which is formed a chamber 2 of sufficient length and depth for its intended purpose. The chamber is preferably semicircular, or substantially so, in cross-section, and its bottom, which is an integral part of the casing, is inclined longitudinally to a suitable drain pipe 3 at one end of the base. Leading into and extending throughout the length of the chamber, are two suitably spaced pipes 4 provided with upwardly-directed sprinkler nozzles 5, preferably arranged in staggered rows, by means of which cleansing liquid is discharged into the interior of a tank, as A, supported in inverted position above the chamber. These pipes are connected to a vertical branch pipe 6, which in turn is connected to a supply pipe 7 for cleansing fluid. A pipe 8 leading from a suitable source of steam supply extends into the branch pipe, and thus steam, preferably under pressure, is intimately mixed with the cleansing fluid during its passage to and through the sprinkler pipes, such fluid being heated and forced into efficient cleansing contact with the internal parts of the inverted tank presented thereto. The pipes 7 and 8 are provided with suitable regulating valves 9 and 10, respectively.

Within the chamber is preferably supported a screen or reticulated basket 11 which extends from end to end of the chamber 2 in such position as to intercept and retain the larger particles of composition or tailings which are washed from the interior of the tank. The basket merely rests upon suitably-disposed cross-bars 12 within the chamber, and thus it can be readily removed or replaced as need may require. It is conveniently provided at its ends with handles 13 in the form of foldable bails.

On one side of the base is hinged a rectangular frame 14 which is adapted to be swung upon and from the base, as indicated in Figs. 2 and 3 respectively. When the frame is in the position indicated in Fig. 3, the top of the upright tank A is applied to the under side of the frame, so that when the frame is swung over upon the base the tank is carried and inverted directly above the base in position to receive the cleansing fluid arising from the sprinkler pipes. Preferably the longitudinal side members of the frame are provided with suitably disposed rollers 15 upon which lateral flanges 16 on the tank are adapted to be run and supported preparatory to the inverting of the frame and tank. The flanges 16 and the opposing portions of the frame members are correspondingly beveled or inclined, as indicated at 17, so that when the frame and tank are inverted as above described the opposing beveled surfaces afford a close joint or seal.

To facilitate the operation of inverting the hinged frame and the tank associated therewith, a counterweight 18 is provided, the same being attached to a cable 19 which passes about suitably disposed sheaves 20 and is connected with the frame.

In the operation of cleaning the composition tank of a match machine, it is necessary to effect the rotation of the composition applying roller 21 and of the composition stirrer 22 so as to subject these members thoroughly to the action of the cleansing fluid. To attain this result I provide mechanism of the following character: On one end of the base is a platform or bracket 23 upon which are supported standards 24 having suitable journals for two parallel shafts 25, 26 which are in axial alinement with the roller 21 and stirrer 22 respectively. The upper shaft 26, which constitutes the primary driving shaft, is actuated in any suitable manner. In the present instance it is equipped with a power driven clutch pulley 27, which is rendered operative or inoperative relative to the shaft by means of a clutch 28 of any ordinary type. The hand lever for operating the clutch is indicated at 29. The shafts 25, 26 are operatively connected and reversely driven by means of meshing gear wheels 27ª which are shown as covered by a gear guard 28ª. The inner ends of the two shafts are provided with sleeves or thimbles 30 which are slidingly though rotatively connected therewith, preferably in each instance by a cross-pin 31 which extends through the shaft into longitudinal slots 32 in the wall of the thimble. Suitably-disposed springs 33 confined within the respective thimbles tend yieldingly to project the latter beyond the ends of their shafts. The outer ends of the thimbles are provided with polygonal holes or sockets 34 corresponding in form with the projecting ends of the shafts of the roller and stirrer respectively; and the parts are so located relatively to each other that when the tank is swung to its inverted position, such projecting shaft ends are in axial alinement with the respective thimbles and can be pushed endwise against the latter in opposition to the action of the confined springs 33. This being done, the thimbles, immediately the holes or sockets thereof coincide with the projecting ends of the shafts, snap into register with such ends and thus couple these shafts with the drive shafts 25, 26 respectively.

When the tank has been disposed above the base and the driving mechanism coupled with the roller and stirrer as just described, the cleansing fluid from the pipe 7 and steam from the pipe 8 are turned on by opening the valves 9 and 10 respectively. Passing into the branch pipe 6 the cleansing fluid is commingled and heated with the inrushing steam; flowing thence into the sprinkler pipes 4; thence being directed by means of the nozzles into the interior of the inverted tank and into contact with the internal rotating mechanisms of the tank.

After the cleaning operation is completed the valves 9 and 10 are closed, thus shutting off the feed of the cleansing fluid and the steam. Clutch lever 29 is operated to shut off the power from the drive shafts, and the tank A, with its roller and stirrer devices, is shifted endwise to uncouple the shafts of said devices from the drive shafts. The hinged frame, with the cleansed tank, is then swung outward to loading position, and the tank removed, thus leaving the apparatus in condition to receive another tank for cleansing.

I claim—

1. In a cleansing apparatus for tanks having internal rotary devices, a chambered structure, means for supporting a tank in inverted position above the chamber of such structure, means for actuating the rotary devices of the inverted tank, sprinkler pipes within said chamber adapted to discharge cleansing fluid into the inverted tank, a fluid supply pipe, a pipe connection between the same and the sprinkler pipes, and a steam supply pipe leading into said pipe connection.

2. In a cleansing apparatus for tanks having internal rotary devices, a chambered structure, means for supporting a tank in inverted position above the chamber of such structure, means for introducing cleansing fluid into the inverted tank, and means for actuating the rotary devices of the inverted tank.

3. In a cleansing apparatus for tanks having internal rotary devices, a chambered structure, a hinged frame thereon having means to support a tank, whereby the tank can be loaded on said frame and inverted and supported thereby above the chamber of such structure, means for introducing cleansing material into the inverted tank, and means for actuating the rotary devices of the inverted tank.

4. In a cleansing apparatus for tanks having internal rotary devices, a chambered structure, means for supporting a tank in inverted position above the chamber of such structure, means for introducing cleansing fluid into the tank, a drive shaft, and a coupling member thereon adapted to connect said shaft with the internal rotary device of the inverted tank.

5. In a cleansing apparatus for tanks having internal rotary devices, including projecting shaft ends, a chambered structure, means for supporting a tank in inverted position above the chamber of such structure, a drive shaft, a spring-pressed coupling sleeve on the end thereof adapted to interlock with the projecting shaft end of the inverted tank, and means for introducing cleansing fluid into the inverted tank.

6. In a cleansing apparatus for tanks having composition rollers and stirrers with projecting shaft ends, a chambered structure, means for supporting a tank in inverted position above the chamber of such structure, drive shafts positioned to be in axial alinement with the roller and stirrer of the inverted tank when in the supporting means, and coupling members on said shafts adapted to interlock with the projecting shaft ends of said roller and stirrer.

Signed at Barberton, in the county of Summit and State of Ohio, this 21st day of October A. D. 1912.

JOSEPH C. DONNELLY.

Witnesses:
 E. A. JACOBS,
 SABINA PARKS.